Sept. 15, 1936.  E. G. ROEHM  2,054,168
ECCENTRIC MILLER
Filed Jan. 22, 1935  8 Sheets-Sheet 1

INVENTOR.
ERWIN G. ROEHM
BY
A. H. K. Parsons
ATTORNEY.

Sept. 15, 1936.   E. G. ROEHM   2,054,168
ECCENTRIC MILLER
Filed Jan. 22, 1935   8 Sheets-Sheet 2
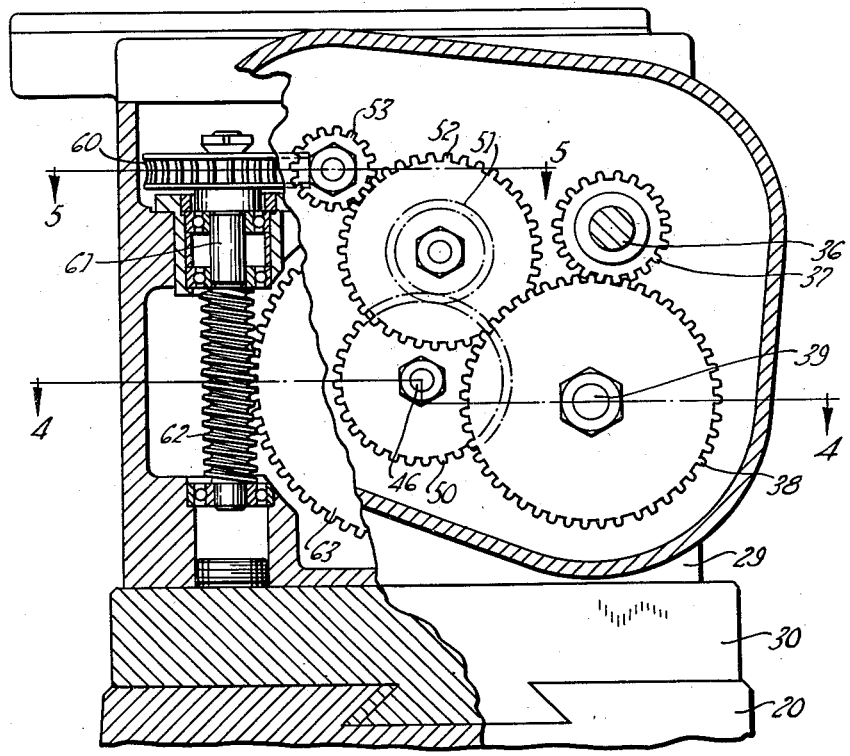
INVENTOR.
ERWIN G. ROEHM
BY
AHK Parsons
ATTORNEY.

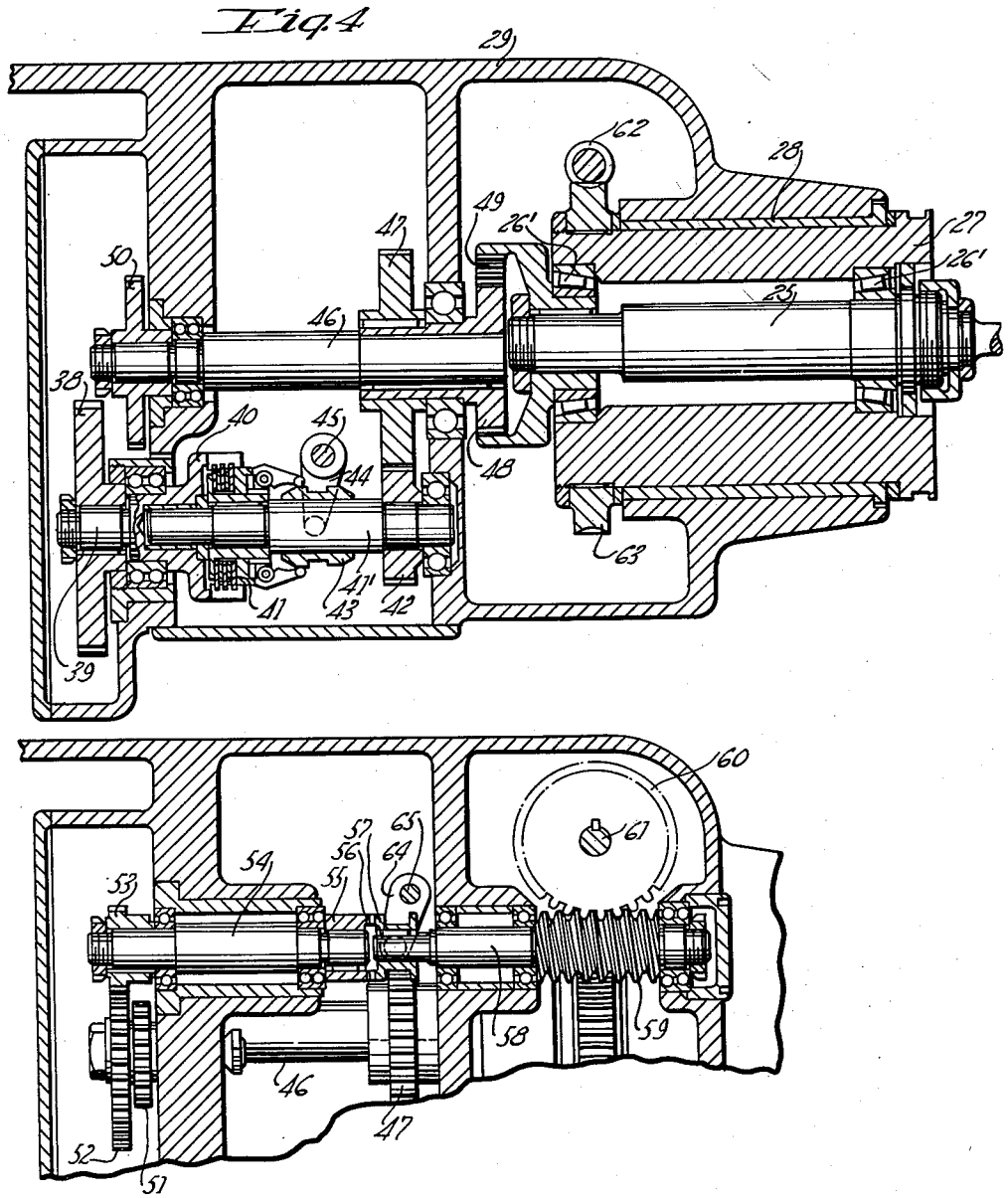

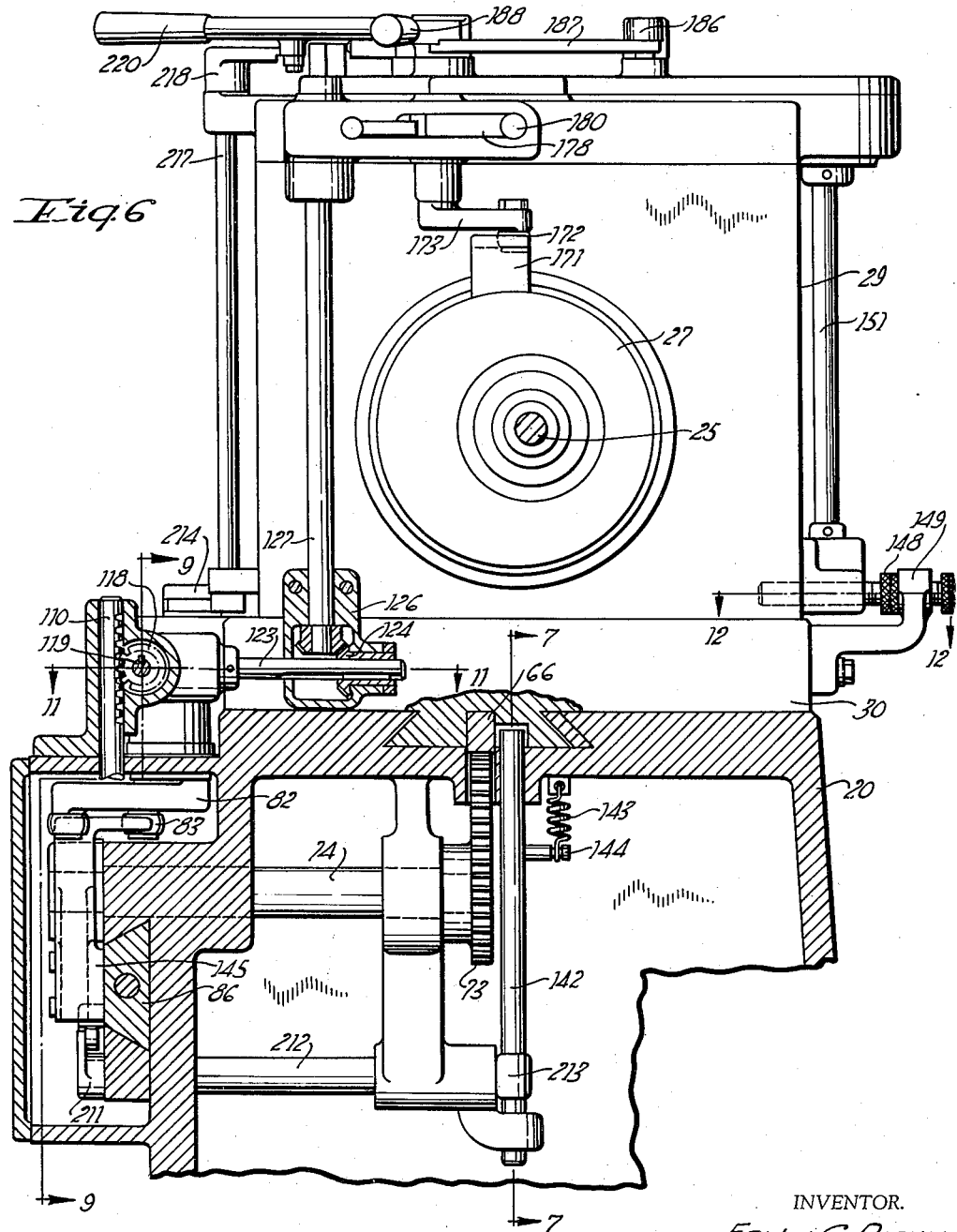

Sept. 15, 1936.   E. G. ROEHM   2,054,168
ECCENTRIC MILLER
Filed Jan. 22, 1935   8 Sheets-Sheet 5
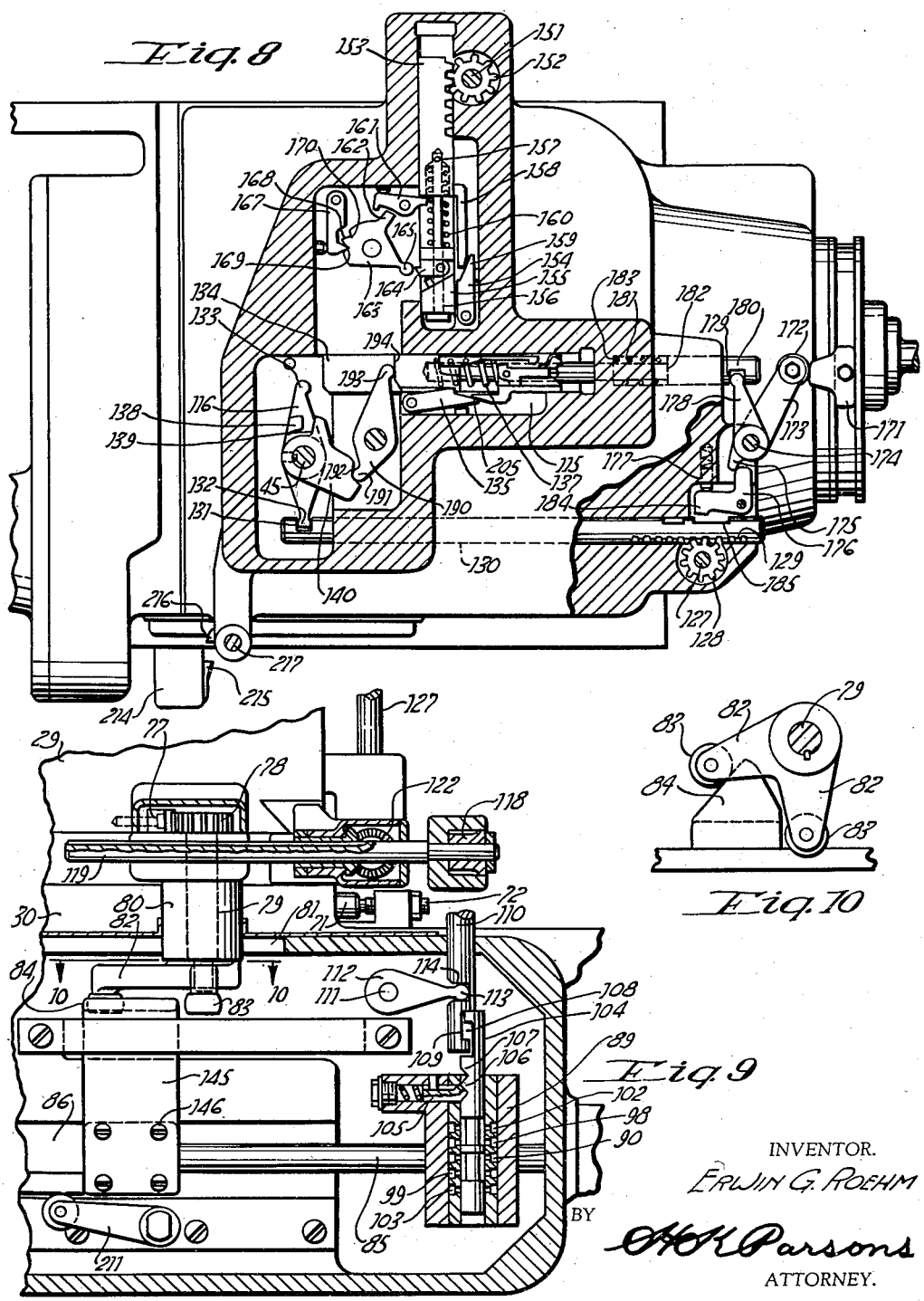
INVENTOR.
ERWIN G. ROEHM
BY
AHKParsons
ATTORNEY.

Sept. 15, 1936.   E. G. ROEHM   2,054,168
ECCENTRIC MILLER
Filed Jan. 22, 1935   8 Sheets-Sheet 6
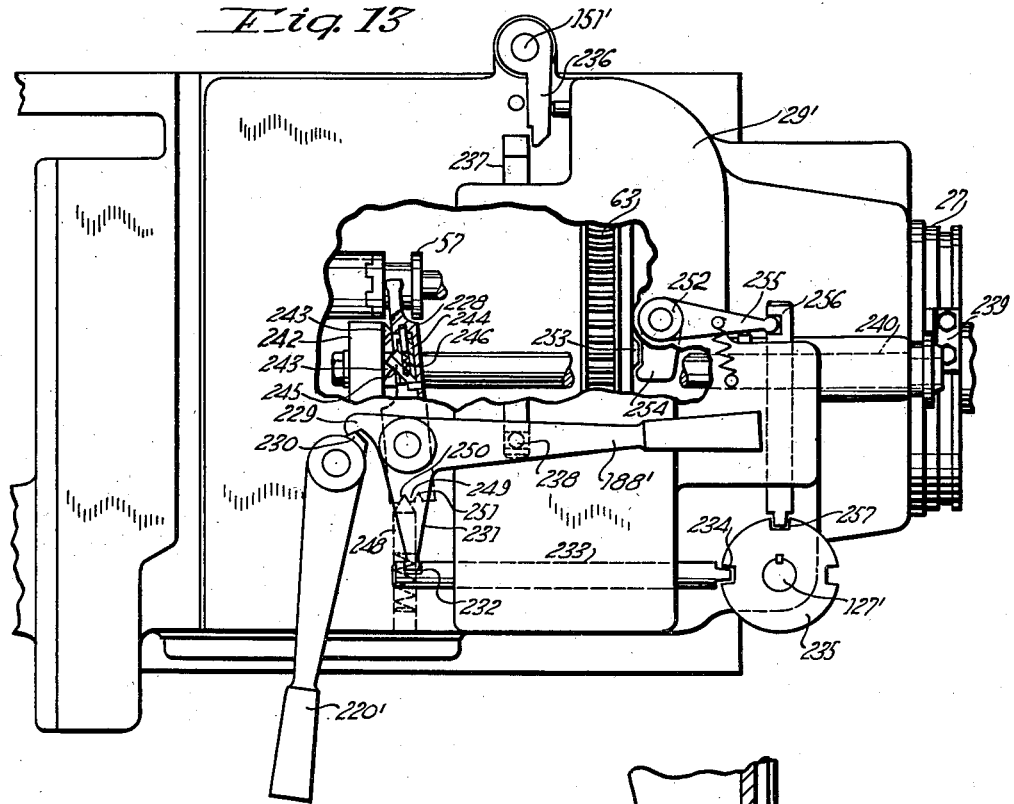
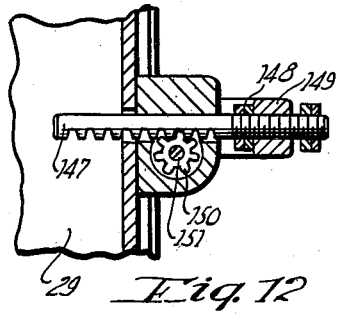
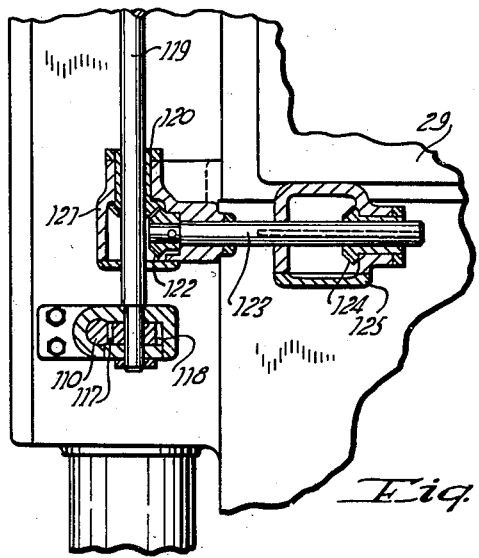
INVENTOR.
ERWIN G. ROEHM
BY
A. K. Parsons
ATTORNEY.

Sept. 15, 1936.  E. G. ROEHM  2,054,168
ECCENTRIC MILLER
Filed Jan. 22, 1935  8 Sheets-Sheet 7

Fig 14

INVENTOR.
ERWIN G. ROEHM
BY
AHK Parsons
ATTORNEY.

Sept. 15, 1936.     E. G. ROEHM     2,054,168
ECCENTRIC MILLER
Filed Jan. 22, 1935     8 Sheets—Sheet 8
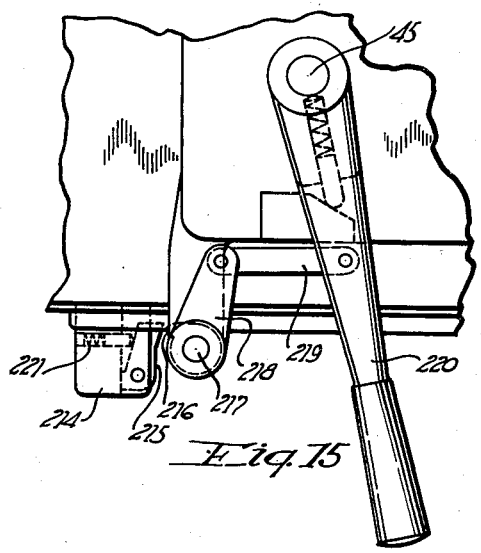
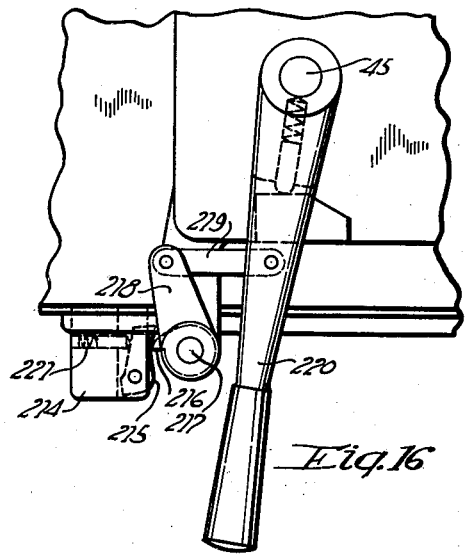
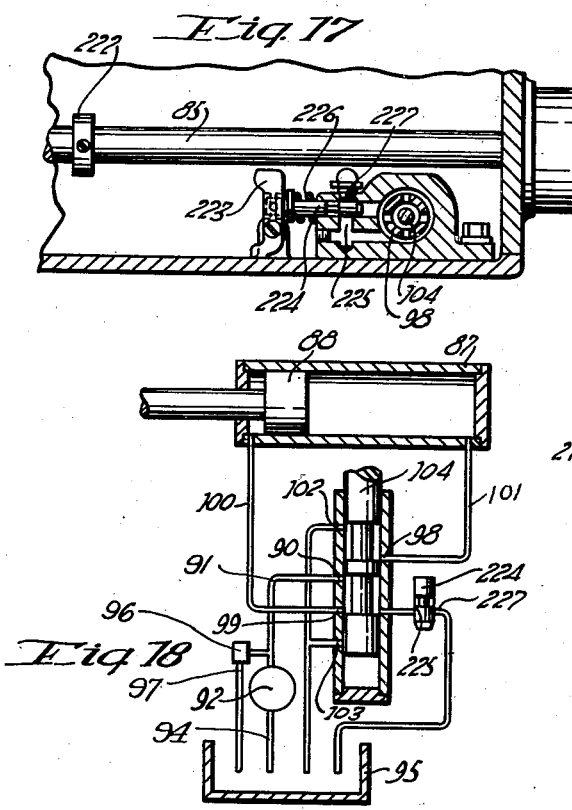
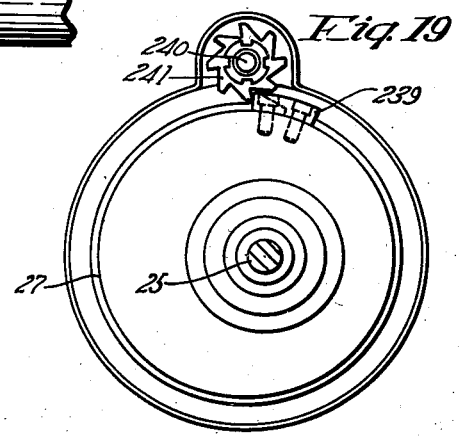
INVENTOR.
ERWIN G. ROEHM
BY
ATTORNEY.

Patented Sept. 15, 1936

2,054,168

UNITED STATES PATENT OFFICE 2,054,168

ECCENTRIC MILLER

Erwin G. Roehm, Norwood, Ohio, assignor to The Cincinnati Milling Machine Co., Cincinnati, Ohio, a corporation of Ohio Application January 22, 1935, Serial No. 2,907

16 Claims. (Cl. 90—15)

This invention relates to milling machines and more particularly to an improved machine for milling annular grooves in work pieces.

One of the objects of this invention is to provide a complete automatic machine for milling internal annular grooves in work pieces.

Another object of this invention is to provide a mechanism for the purposes set forth in which the various positioning movements may be effected hydraulically and thereby in a minimum of operating time.

A further object of this invention is to provide a machine for the purposes set forth in which all of the movements, either positioning or operating, are imparted to the cutter whereby annular grooves may be formed in work pieces which are not of suitable shape or size for imparting rotation thereto.

An additional object of this invention is to provide a machine of the character described in which certain interlocks are provided to improve the safety of operation of the machine as a whole.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a side elevation of a machine embodying the principles of this invention.

Figure 2 is a plan view of the machine shown in Figure 1.

Figure 3 is a vertical section through the gear box taken on the line 3—3 of Figure 1.

Figure 4 is a horizontal section on the line 4—4 of Figure 3.

Figure 5 is a horizontal section on the line 5—5 of Figure 3.

Figure 6 is a vertical section as viewed on the line 6—6 of Figure 1.

Figure 7 is a detail section on the line 7—7 of Figure 6, showing the slide operating mechanism.

Figure 8 is a plan view, partly in section, as viewed on the line 8—8 of Figure 1.

Figure 9 is an enlarged detail view of a portion of the operating mechanism as viewed on the line 9—9 of Figure 6.

Figure 10 is a detail view of the trip mechanism for operating the cross slide as viewed on the line 10—10 of Figure 9.

Figure 11 is a detail view taken on the line 11—11 of Figure 6.

Figure 12 is a detail view on the line 12—12 of Figure 6.

Figure 13 is a plan view of a modified form of the invention.

Figure 14 is an enlarged view of a portion of Figure 8 with the parts shown in a different position.

Figures 15 and 16 are views showing different positions of the spindle clutch control mechanism.

Figure 17 is a detail view of the by-pass valve operating mechanism.

Figure 18 is a diagram of the hydraulic circuit of the machine.

Figure 19 is a detail view of the carrier trip mechanism shown in Figure 13.

The machine embodying the principles of this invention and shown in Figures 1 and 2 of the drawings, comprises a bed 20 having a fixed work support 21 mounted thereon for receiving a work piece, such as 22, which may be securely clamped to the work support by suitable means depending upon the size and shape of the work, and in the present instance comprising a pair of upright clamping bolts 23 and a cross strap 24. Suitable positioning means may be provided, depending upon the character of the work and the number and position of locating surfaces or holes therein.

It will be noted that the work table 21 is adapted to receive various sizes of work which are impossible of mounting in a rotatable chuck. This is made possible by so constructing the machine that all of the positioning and operating movements are imparted to the tool.

The cutter spindle 25 shown in Figure 1, which has the cutter 26 secured to the end thereof, is journaled in anti-friction bearings 26', as more particularly shown in Figure 4, which are in turn supported eccentrically in the rotatable head 27. The head, in turn, is journaled in a large bearing 28. This bearing is carried by cross slide 29, which in turn is movable with a horizontal reciprocable slide 30, the slide 30 being movable toward and from the work table 21.

Briefly, the automatic cycle of operation of the machine is to advance the reciprocable slide 30 toward the work table 21 so as to insert the cutter 26 into a bore, such as 31, of the work piece in which bore the annular groove, such as 32, is to be formed. The cross slide is then moved at a suitable rate to sink the cutter into the work and then the head 27 is rotated to complete the groove. At the finish of the cutting operation the parts are retracted in reverse order.

The mechanism for rotating the cutter spindle is more particularly shown in Figures 2, 3 and 5, and comprises a prime mover 33 which is attached to the rear of the cross slide, as more particularly shown in Figure 2, and connected by motion transmitting means such as a plurality of V-plates 34 to a drive pulley 35 secured to the end of shaft 36. This shaft, as shown in Figure 3, has a pinion 37 keyed thereto in mesh with a large gear 38 fixed to the end of shaft 39 as more particularly shown in Figure 4. The shaft 39 rotates the outer member 40 of a multiple disc friction clutch 41 which is adapted to connect the member 40 to shaft 41', carrying gear 42. The clutch is engaged and disengaged by a shifter spool 43 which is moved back and forth by a shifter fork 44 fixed with operating shaft 45. When the clutch is engaged, pinion 42 rotates shaft 46 through gear 47, the shaft 46 having fixed on one end a gear 48 which intermeshes with an internal gear 49 keyed to the end of shaft 25. The position and size of gear 48 and the internal gear 49 are such as to maintain a driving relation between them throughout a complete rotation of the head 27. From this it will be seen that a very simple transmission has been provided for rotation of the spindle and that this rotation may be controlled by the friction clutch 41.

The rotary head 27 is also driven from the prime mover 33 but is subject to control by the spindle clutch 41 in such a way that the head 27 cannot be rotated unless the cutter spindle is rotating also. This is accomplished by connecting the branch transmission for rotation of the head 27 to the shaft 46, which in turn is controlled by the friction clutch. This shaft, as shown in Figure 4, has a gear 50 fixed to one end thereof which is connected by a gear train comprising the small gear 51 in mesh with gear 50, and a gear 52 co-axial with gear 51 and fixed therewith, to a pinion 53 fixed to the end of shaft 54 as more particularly shown in Figure 5. The shaft 54 drives a sleeve 55 upon the end of which are formed clutch teeth 56 and adapted to be interengaged by the jaw tooth clutch member 57. This clutch member serves to interconnect shaft 54 with the worm drive shaft 58 having the worm 59 fixed thereto in mesh with a worm gear 60.

From Figure 3 it will be seen that the worm gear 60 is fixed to the upper end of a vertical shaft 61, which in turn has another worm 62 formed thereon and intermeshing with a large worm gear 63. The worm gear 63 is keyed on the periphery of the rotary head 27, as shown in Figure 4. These two worm reductions in series provide for a very slow rate of rotation of the rotary head in spite of the fact that they are driven from the high speed spindle transmission. These reductions also provide a very powerful drive for effecting relative movement between the cutter and work.

The clutch member 57 is moved into and out of a driving position by a shifter fork 64 fixed to the end of control shaft 65. It will now be seen that when the cutter spindle transmission is being operated, that the branch transmission to the rotary head is also operating, but selective means are provided whereby the rotary head may be disconnected at any time without disturbing the rotation of the cutter spindle. The mechanism for moving the horizontal slide 30 toward and from the work support is more particularly shown in Figure 7 and comprises a rack 66 which is adjustably secured to the under side of the slide and may be adjusted by the screw 67 which is threaded in a bore 38 formed in the end of the rack member, the screw having a squared operating end 69 and a graduated dial 70 associated therewith. The screw is fixed against axial movement so that rotation thereof will effect axial movement of the rack. The purpose of this micrometer adjustment is to determine the position of the cutter with respect to the work and to this end the end 71 of the rack bar is reduced in diameter to form a support for the end of the rack bar and an abutment for engaging the positive stop 72. This positive stop is a threaded member mounted in a fixed part of the bed.

Reciprocation is effected by a gear sector 73 keyed to shaft 74 interengaging with the rack teeth 66. The shaft 74 projects through the front wall of the bed into the control box 75, as more particularly shown in Figure 1, where it is provided with a bifurcated operating arm 76. It will now be seen that oscillation of this arm will effect movement of the slide 30 toward and from the work support. The cross slide 29 is moved by the mechanism shown in Figures 9 and 10 and comprises a rack bar 77 fixed to the slide 29 and a pinion 78 fixed to shaft 79, journaled in the bracket 80 which is integral with the slide 30. The bracket 80 projects through an opening 81 formed in the top of the control box and the lower end of the shaft, which projects beyond the bracket, is provided with a pair of crank arms 82 in the end of each of which is mounted a roller 83. These rollers are adapted to be alternately engaged by a dog 84 which constitutes the means for rotating shaft 79 and pinion 78 and thereby reciprocation of the rack 77 and slide 29.

The engagement and disengagement of the control clutches and the movements of the slides are all effected in a predetermined sequence and in timed relation with the reciprocation of a control piston rod 85 and connected slide 86. The piston rod, as shown in Figure 1, extends into a cylinder 87 which has a contained piston 88 fixed to the end of the piston rod.

Admission of fluid pressure to the cylinder is controlled by the valve 89, Figures 9 and 18, which has a pressure port 90 connected by a supply pipe 91 to pump 92, which is rotated by electric motor 93. The pump has an intake pipe 94 through which the pump withdraws fluid from a reservoir 95 formed in the bed of the machine. The pipe 91 may also have a relief valve 96 therein connected by a pipe 97 to the reservoir for returning excess fluid when the pressure rises beyond a predetermined amount.

The valve also has ports 98 and 99 which are connected by pipes 100 and 101 respectively to opposite ends of the cylinder 87. The valve also has a pair of exhaust ports 102 and 103 whereby when one end of the cylinder is connected to pressure, the other end of the cylinder may be connected to reservoir. The valve plunger 104 which controls these connections has only two positions, and a spring pressed detent 105, alternately engageable with indents 106 and 107 formed in the plunger, serves to hold the plunger in either one of these two positions. The upper end of the plunger has an elongated slot 108 cut therein which interfits in an elongated slot 109 formed in the side of the plunger 110. A certain amount of lost motion is provided in this connection whereby plunger 110 may be given a certain amount of movement before the valve is shifted. The valve is moved upward to the position shown in Figure 9 by the manual control lever 110' which, as shown in Figure 1, is fixed on the end of shaft 111, this shaft extending into the control box and provided with a lever 112 which has a ball-shaped end 113 fitting in a slot 114 formed in the side of plunger 110. The lever 110' has three positions represented by the three dash and dot lines in Figure 1, and upon starting the machine the lever is moved to its extreme upper position. In moving to this position it first takes up the lost motion between plunger 110 and the valve plunger for purposes to be described later and then moves the valve plunger upward to the position shown in Figure 9. After the machine has started, the lever is moved to its intermediate position which places the plunger 110 in the position shown in Figure 9 so that upon downward movement of plunger 110, by automatic means to be described later, the valve plunger 104 may be immediately shifted downward to effect reverse movement of piston 88. This intermediate position of control lever 110' is called the running position.

The machine is reversed by the firing of a spring loaded mechanism indicated generally by the reference numeral 115 in Figure 8 and one of the functions of the lever 110' is to reload this spring mechanism at the beginning of a cycle of operation and also to engage the spindle control clutch 41. These functions are effected by a lever 116 which is operatively connected to the plunger 110 by the following mechanism.

As shown in Figures 6 and 11 the plunger 110 has rack teeth 117 formed on the upper end thereof which intermesh with a pinion 118 keyed to the end of shaft 119. This shaft is splined in a bevel gear 120 journaled in a bracket 121 which is carried by the horizontal slide 30. This bevel gear meshes with a second bevel gear 122 fixed to the end of a spline shaft 123 for rotation of bevel gear 124 journaled in a bracket 125 carried by the cross slide 29.

As shown in Figure 6, the bevel gear 124 meshes with a bevel gear 126 fixed to the lower end of the vertical shaft 127 which has a pinion 128 fixed to the upper end thereof, as shown in Figure 8. This pinion meshes with rack teeth 129 formed on the shifter rod 130, the shifter rod having a slot 131 formed in the opposite end for receiving the ball-shaped end 132 of lever 116. When the control lever 110' is moved to its extreme upper position it effects axial movement of shifter rod 130 from the position shown in Figure 14 toward the left as viewed in Figure 8, whereupon the end 133 of lever 116 is moved toward the right to shift the plunger 134 and reload the spring operated mechanism 115. This movement is sufficient to permit the spring pressed latch lever 135 to engage a shoulder 136 formed on the member 134 and hold the member in the position shown in Figure 8 against the compression of spring 137.

Also, during the movement of reloading the spring mechanism a lug 138 projecting from lever 133 engages a shoulder 139 on lever 140 to rotate this lever in a clockwise direction as viewed in Figure 8 and thereby, through the shaft 45 to which it is keyed, effect engagement of the spindle clutch shown in Figure 4.

During the latter part of the movement of lever 133 the valve 104 is shifted, which admits pressure to the right hand end of cylinder 87 to thereby cause movement of slide 86 to the left as viewed in Figure 1, this slide automatically controlling the sequence of movements of the remaining parts of the machine. When this begins, the operator moves the lever 110 back to its intermediate position which thereby causes movement of rod 130, Figure 8, and lever 133 to the position shown in Figure 8.

As the slide 86 moves toward the left a roller 141 engages the bifurcated lever 76 and effects rotation thereof in a clockwise direction, as viewed in Figure 1, and thereby through the mechanism shown and described in Figure 7, advances the slide 30 toward the work support 21, inserting the cutter 26 in the bore 31 of the work piece. Simultaneously, with abutment of the member 71 with the positive stop 72 a locking member 142 is snapped into position by a spring 143 shown in Figure 6. This spring has one end attached to a pin 144 fixed in the locking member 142 and the other end attached to a fixed part of the bed. This locks the slide 30 in its forward position and advances the bracket 80 to the position shown in Figure 9 for engagement of the dog 84, Figure 10, with one of the rollers 83 to effect rotation of shaft 79. The dog 84 is carried on the upper end of a plate 145 secured as by a plurality of screws 146 to the slide 86. Clockwise rotation of shaft 79, as viewed in Figure 10, will cause movement of the cross slide 29 in a direction away from the operator and sinking of the cutter into the work. As the cross slide completes its movement it moves the rack 147 to the right, as viewed in Figure 12, taking up the lost motion between the lock nuts 148 threaded thereon and the fixed abutment 149 so that upon continued movement the rack will rotate the pinion 150 meshing therewith. This pinion is secured to the lower end of a shaft 151 which extends upward as shown in Figure 6 into the top of the cross slide, where it has a second pinion 152 keyed thereto, as more particularly shown in Figure 8. Since the slide 29 is moving toward the right in Figure 12 it will effect counterclockwise rotation of shaft 151 and thereby counterclockwise rotation of pinion 152, Figure 8. This will operate a mechanism to effect engagement of clutch 57 and thereby rotation of the rotary head. This mechanism comprises a load and fire mechanism consisting of a plunger 153 which is shown in its return position in Figure 14. In this return position a latch pawl 154 engages the end of member 155 which is relatively movable on the headed rod 156 which is secured as by a pin 157 for movement with plunger 153. As the plunger 153 is advanced by counterclockwise rotation of pinion 152 a finger 158 engages the beveled end 159 of pawl 154 to retract the same. Prior to this, however, a spring 160, which is mounted on the rod 156 between members 153 and 155, has been compressed so that when the pawl 154 is retracted the member 155 will be fired. Just prior to this firing a locking pawl 161 is rotated clockwise out of the path of movement of a wing 162 projecting radially from the detent member 163 so as to permit clockwise movement thereof by engagement of a pawl 164 with the ball-shaped end 165 of a second arm 166 projecting from the member 163. The pawl 164 will rotate the member 163 through a sufficient angle to cause the spring pressed detent 167 to ride over the peak 168 formed between the two indents 169 and 170 formed in the periphery of member 163. The spring pressed detent will complete the rotation of member 163 and through a sufficient angle so that the ball-shaped end 165 will just be out of the path of pawl 164, when the same is returned in an opposite direction. The member 163 is keyed to the end of shaft 65, which, as shown in Figure 5, has the shifter fork 64 fixed therewith. Thus the clutch 57 is automatically engaged to cause rotation of the rotary head and thereby the formation of the annular groove.

A dog 171 is secured to the periphery of the rotary head 27 as more particularly shown in Figure 8, and up to this time, has been in engagement with a roller 172 mounted in the end of lever 173 keyed to shaft 174. This shaft has a lug 175 projecting therefrom into engagement with one end of a bell crank 176 which is constantly urged by a spring 177 in a counterclockwise direction, thereby exerting a constant urge on the lever 173 in a clockwise direction. The shaft 174 also has fixed therewith a ball-ended lever 178 which engages a slot 179 formed in the side of a plunger 180, which plunger serves to trip the spring loaded mechanism indicated generally by the reference numeral 115. Therefore, upon initiation of rotation of the rotary head 27 the dog 171 will move away from the roller 172 and permit the spring 177 to rotate the crank 176 in a counterclockwise direction and also permit a spring 181, which is mounted between a shoulder 182 on plunger 180, and a fixed shoulder 183, to move the plunger 180 toward the right and reset the mechanism for tripping after the head 27 has made a complete revolution.

The bell crank 176 has a lug 184 projecting therefrom which engages a slot 185 formed in the lever 130 to prevent movement thereof in a direction corresponding to downward movement of lever 110 to its reverse position. This insures against inadvertent operation of lever 110 during the cutting of the annular groove.

Attention is invited to the fact that when the shaft 65, Figure 5, was rotated clockwise to engage clutch 57 that a crank arm 186 secured to the end of shaft 65, which projects above the top of the cross slide, as shown in Figure 2, is also rotated clockwise and through a connecting link 187 rotates the manual control lever 188. This lever is secured to a shaft 189 which projects inside of the housing and has a double ended lever 190 secured thereto, more particularly shown in Figure 8. When the clutch 65 is engaged, the lever 190 is rotated from the position shown in Figure 14 to the position shown in Figure 8, whereby it serves to act as a locking member to prevent inadvertent rotation of the arm 140 by engagement of the ball-shaped end 191 with a depression 192 formed in the end of lever 140. The other end 193 of lever 190 is moved into engagement with a shoulder 194 formed on the plunger 134 and thereby in a position to be actuated upon firing of the spring loaded mechanism 115.

This mechanism is shown in detail in Figure 14 and comprises member 134 which is slidedly mounted in the bore 195 and has secured to one end, as by a pin 196, an axially extending rod 197. This rod supports for movement relative thereto a slideable member 198 which has pivotally secured thereto a pawl 199. This pawl is normally held in the position shown by a small leaf spring 200 secured to the upper side thereof. This spring tends to cause clockwise rotation of the pawl but a shoulder 201 limits its rotation to the position shown. The end of this pawl engages a pin 202 carried in the end of lever 188. The pin 202 has portions cut away to form a small shoulder 203 which engages the end 199' of the pawl to cause movement of the member 198 toward the left. These parts are in engagement when the rotary head completes its revolution and rotates the trip lever 173 in a counterclockwise direction, and thereby through lever 178 causes axial movement of rod 180. Movement of rod 180 toward the left will move the member 198 through engagement of shoulder 203 with the end of pawl 199 and cause the finger 204, projecting from the side of member 198, to engage the bevel face 205 formed on the end of latch pawl 135 to effect retraction thereof. This movement will also compress the spring 137 so that when the lever 135 is retracted the member 134 will be fired toward the left. As this firing takes place, an elongated finger 206, having a shoulder 207, will engage the upturned end 208 of pawl 199 and rotate the same counterclockwise and just at the termination of the firing movement. This counterclockwise rotation will lift the end 199' of pawl 199 out of engagement with the shoulder 203, and the spring 137 will then retract the member 198 in spite of the fact that the pin 202 and rod 180 remain in the position shown. This automatic retraction of member 198 permits the plunger 134 to be moved toward the right and reset later on without interference from the member 204.

It will now be seen that movement of the cross slide in a direction to sink the cutter into the work automatically causes engagement of the control clutch 57 through the load and fire mechanism shown in the upper part of Figure 14 and simultaneously through the linkage 186, 187, 188 positions the member 190 so that upon completion of a single rotation of the head 27 the clutch 57 may be automatically disengaged through tripping of the load and fire mechanism 115; and tripping of this mechanism not only disengages the clutch but rotates the detent plate 163 back to the position shown in Figure 14, in spite of the fact that the load and fire mechanism associated therewith in this figure is still in a fired position, or in other words in the position shown in Figure 8.

Tripping of the load and fire mechanism 115 by the dog 171 after completion of a single rotation of the head 27 also rotates the lever 116 to the position shown in Figure 14 which moves the rod 130 toward the right and through the interconnecting mechanism previously described causes downward movement of plunger 110 and shifting of valve plunger 104 to a reverse position, or in other words, to a position causing admittance of fluid pressure to the left hand end of cylinder 87, Figure 1. This results in the slide 86 starting its movement toward the right, the first effect of which is to rotate the mechanism shown in Figure 10 to cause, through pinion 78 and rack 77, the retraction of the cross slide. As this cross slide retracts it again causes bodily axial movement of rack 147, Figure 12, a sufficient amount to take up the lost motion in its connection with the fixed part of the machine and during the final part of the movement cause rotation of pinion 150 in a clockwise direction. This will cause a clockwise rotation of pinion 152, Figure 14, which in turn will retract the plunger 153 a sufficient amount to permit the latch pawl 154 to snap into the position shown in Figure 14. In this return movement the pawl 154 will snap by the end of arm 166 of detent plate 163 due to the fact that it is free to rotate in a counterclockwise direction, but a spring pressed plunger 209 assists in returning it to the position shown in Figure 14 after it has passed arm 166. Also, pawl 161 will return to its locking position shown in Figure 14 to act as means for preventing engagement of clutch 57 and thereby rotation of the rotary head until the cross slide is again moved to a cutting position.

As the slide 86 continues its movement a cam surface 210 formed thereon will engage the end of oscillatable lever 211 connected to the end of shaft 212, which shaft extends interiorly of the machine and is provided with an operating lever 213 for withdrawing the locking plunger 142 as shown in Figure 7. Immediately after the locking plunger is withdrawn the roller 141 rotates lever 76 in a counterclockwise direction and effects, through the mechanism previously described and connected to shaft 74, retraction of the slide 30.

Attention is invited to the fact that the spindle clutch 41 is automatically disengaged during return movement of the cross slide by means of the following mechanism. As shown in Figures 8, 15 and 16, the slide 30 carries a bracket 214 in which is pivotally mounted a trip pawl 215 which engages a short lever 216 keyed to shaft 217, which shaft carries at its upper end a lever 218 connected by link 219 to the manually operable lever 220. This lever is fixed to the upper end of shaft 45 which, as previously explained, in connection with Figure 4, carries the shifter fork 44, which in turn controls engagement and disengagement of the friction clutch 41. The relationship of the return movement of the cross slide to the movement of lever 216 is such that the lever 216 will be rotated a sufficient amount to clear the end of lever 215 and pass slightly beyond it before the cross slide stops. In other words, at the termination of the return movement of the cross slide the parts will be in the position shown in Figure 15. The purpose of this arrangement is to permit the spindle clutch to be reengaged upon rotation of lever 116 by the starting lever 110', without interference between the lever 216 and the trip lever 215. In other words, when the parts are actuated by the starting lever 110' the lever 215 will rotate in a counterclockwise direction and engage the side of lever 215 moving the same in a counterclockwise direction against the compression of spring 221. The parts will now be in the position shown in Figure 16. Upon initial movement of the cross slide in a direction to sink the cutter into the work, the lever 216 will pass beyond the end of lever 215, permitting the same to snap outward to the position shown in Figure 8. This will condition the parts for tripping upon return movement of the cross slide.

As the slide 86 completes its movement toward the left a collar 222 secured to the piston rod 85, actuates through a pivoted lever 223 the by-pass valve plunger 224 to connect the line 100 to the reservoir 95, thereby stopping movement of piston 88. This valve has a port 225 which is connected through interdrilling, as shown in Figure 17, to port 98 of the reversing valve 89. When the plunger 224 is moved to the right against the compression of spring 226 the port 225 will be connected to the exhaust port 227.

Even although the valve plunger 224 is held in this position by the collar 222 it in no way interferes with restarting the machine because when the valve plunger 104 is moved to its upper position as shown in Figure 9, the port 98 is connected to reservoir anyway and the port 99 may be connected to pressure, causing movement of the piston 88 to the left and retraction of the collar 222 from lever 223, permitting the spring 226 to come into operation and close port 225, thereby conditioning this side of the circuit for reversal so that the by-pass through this valve will be disconnected when pressure is admitted to port 98.

This mechanism forms a means for automatically stopping the machine at the end of the cycle and at the same time relieves the pump 92, thereby eliminating excessive pressures building up in the system which would have to be discharged through the relief valve 96.

It should now be apparent that a complete automatic machine has been provided for the purposes intended in which an hydraulic reciprocable member controls the timing and sequence of the various positioning movements to place the cutter to depth in the work and means trip operable upon completion of the cutting cycle to initiate retraction of the various parts in proper timed sequence by the hydraulically operable control member and means for automatically stopping the machine at the completion of a cycle of operation.

It may be desired to manually control part of the cycle of operation of the machine and therefore a modified form of the invention is illustrated in Figure 13, which may be considered a semi-automatic machine. In Figure 13 the parts are shown with the cutter sunk into the work which means that the cross slide 29' is moved to its extreme position in a direction toward the top of the sheet. The lever 220', which is operatively connected, as before, through the shaft 45 for control of the spindle clutch, is in a left-hand position corresponding to engagement of the spindle clutch, and therefore, the cutter spindle is rotating. The lever 188' is operatively connected through the lever 228 for control of clutch 57, which determines rotation of the head 27. It will be noted that the lever 188' has a lug 229 on the end thereof which engages a lug 230 on the end of lever 220' so that in the position of the parts the spindle clutch cannot be disengaged until the clutch 57 has been withdrawn. This serves as a sort of interlock to insure that the cutter is rotating during rotation of the head.

The lever 188' has an arm 231 which interfits a slot 232 in an interlocking rod 233, the end of which in the position of the parts shown enters a notch 234 formed in the periphery of disc 235. This disc is secured to the end of shaft 127' which corresponds to shaft 127 in Figure 8. This shaft is rotated by a manual control lever 110' when the same is operated to change the direction of fluid pressure in the cylinder 87. Since the rod 233 engages the notch 234, the disc 235, and thereby the lever 110', is held against movement during the cutting operation and serves as an interlock for that purpose.

The shaft 151', corresponding to shaft 151 of Figure 8, is rotated in the same manner and when the slide 29' moves to the position shown in Figure 13 this shaft is rotated in a counterclockwise direction, which thereby moves the lever 236 connected to the upper end thereof in a counterclockwise direction, withdrawing the end of the lever from the path of movement of rod 237 connected for movement as by a pin 238 with lever 188'. The lever 236 serves as an interlock to prevent counterclockwise rotation of lever 188' to the position shown until the cross slide 29' has completed its cross movement. In other words, the head 27 cannot be rotated until the cutter has been sunk to depth in the work.

Upon completion of a single rotation of the head 27 a dog 239 carried thereby rotates shaft 240 through a star wheel 241, shown in Figure 19, and a cam wheel 242 having a series of V-shaped projections 243 adjacent the rim thereof for shifting lever 228. The lever has a slide 244 reciprocably mounted therein which has a V-shaped lug 245 projecting from the side thereof for engagement by one of the projections 243 so that upon movement of the wheel 242 the slide is moved forward against the compression of spring 246 a predetermined amount until it hits a solid part of the lever when a camming action follows, shifting the lever 228 toward the right a sufficient amount to cause the spring-pressed detent 248 to pass over the peak 249 intermediate the indents 250 and 251, whereby the detent 248 will complete the shifting movement and disengage clutch 57.

Completion of this shifting movement will move the lug 243 on the slide 245 a sufficient amount to permit the spring 246 to return the slide a sufficient amount so that the clutch may be reengaged without interference with the projecting lugs on the side of wheel 242.

Simultaneously with the actuation of the star wheel by dog 239 a bell crank 252 is rotated by engagement of a lug 253 carried by the worm wheel 63 with the end of lever 254. The bell crank 252 has a ball-ended lever 255 engaging a slot in the side of locking plunger 256 for withdrawing the same from a second notch 257 formed in the wheel 235.

Rotation of the rotary head 27 has now ceased and the control parts are in such a position that the lever 228' may be rotated to disengage spindle clutch 41 and correspondingly stop rotation of the cutter spindle, and the plungers 233 and 256 have been withdrawn so that shaft 127' is free to rotate, whereby the lever 110' may be operated to reverse the pressure in the hydraulic cylinder and cause, first, retraction of slide 29' and subsequently retraction of the main slide 30. Retraction of slide 29' will replace the lever 236 to prevent subsequent engagement of clutch 57 until the cutter has been repositioned in engagement with the work.

There has thus been provided an improved mechanism for performing the complicated milling operations indicated, and which is simple to construct and operate and which has suitable interlocks to insure that the various movements are effected in the proper sequence.

I claim:

1. In a machine tool having a work support and a tool support, the combination of means for effecting relative movement between the supports in a first direction, an adjustable positive stop for limiting said movement, automatically actuable means for locking the support in said position, and additional means for effecting relative movement between said supports in an angular direction with respect to said first direction, and a common fluid operable member for actuating each of said means.

2. In an eccentric miller having a work support and a tool spindle, the combination of means for positioning the spindle in a bore of a work piece, said spindle being supported for bodily lateral movement and for bodily movement in an orbital path, a power operable transmission including a clutch for connecting said transmission to effect said orbital movement, fluid operable means for moving said spindle laterally to effect engagement of the tool with the work and engaging said clutch, and means responsive to completion of said orbital movement for automatically disengaging said clutch.

3. In a milling machine having a work support, the combination of a first slide movable toward and from the work support, a cross slide supported by said first slide, a cutter spindle and cutter journaled in said cross slide, power operable means for effecting bodily orbital movement of the cutter spindle in the cross slide including a control clutch, fluid operable means for moving the cross slide in a direction to cause engagement between the cutter and work, and means trip actuable from movement of the cross slide for engaging said clutch.

4. In a milling machine having a work support, the combination of a first slide movable toward and from the work support, a cross slide supported by said first slide, a cutter spindle and cutter journaled in said cross slide, power operable means for effecting bodily orbital movement of the cutter spindle in the cross slide including a control clutch, fluid operable means for moving the cross slide in a direction to cause engagement between the cutter and work, and trip mechanism operatively connected for actuation by the cross slide for effecting engagement of said clutch, said operative connection including lost motion means whereby actuation of said trip mechanism will occur at the end of the cross slide movement.

5. In a milling machine having a work support, the combination of a first slide movable toward and from the work support, a cross slide supported by said first slide, a cutter spindle and cutter journaled in said cross slide, power operable means for effecting bodily orbital movement of the cutter spindle in the cross slide including a control clutch, fluid operable means for moving the cross slide in a direction to cause engagement between the cutter and work, and load and fire mechanism for effecting engagement of said clutch including an operating member, lost motion connections between said member and the cross slide whereby at the end of one extreme movement of the cross slide the mechanism will be loaded and fired and at the other extreme movement of the cross slide the operating member will be returned to recondition the mechanism.

6. In a machine for milling internal grooves the combination of a movable slide, a cutter spindle eccentrically journaled in the slide, means to move the slide to effect engagement between a cutter carried by the spindle and a work piece, power operable transmission means for effecting orbital movement of the cutter spindle including a control clutch, a first load and fire mechanism operable by the slide for effecting engagement of said clutch, and a second load and fire mechanism trip actuable by the orbital movement of the cutter spindle to effect disengagement of said clutch.

7. A milling machine having a work support, a first slide movable toward and from the work support, a rack and gear mechanism for effecting said movement, a cross slide movable transversely of the first slide, a rack and gear mechanism for reciprocating the cross slide, a spindle carrier journaled in the cross slide, a cutter spindle and cutter journaled in the carrier eccentrically thereof, power operable means for rotating the spindle and carrier including a separate clutch arranged in serial power transmitting relationship, a fluid operable member for actuating said mechanisms, a source of pressure including a reversing valve, a manual control lever for shifting said valve to a starting position and simultaneously engaging the spindle control clutch and means actuable by advance of said member for sequentially operating said mechanisms and their respective slides to engage the cutter with the work.

8. A milling machine having a work support, a first slide movable toward and from the work support, a rack and gear mechanism for effecting said movement, a cross slide movable transversely of the first slide, a rack and gear mechanism for reciprocating the cross slide, a spindle carrier journaled in the cross slide, a cutter spindle and cutter journaled in the carrier eccentrically thereof, power operable means for rotating the spindle and carrier including a separate clutch arranged in serial power transmitting relationship, a fluid operable member for actuating said mechanisms, a source of pressure including a reversing valve, a manual control lever for shifting said valve to a starting position and simultaneously engaging the spindle control clutch, means actuable by advance of said member for sequentially operating said mechanisms and their respective slides to engage the cutter with the work, and means operable by the cross slide to engage the spindle carrier clutch to cause planetary movement of the cutter spindle.

9. A milling machine having a work support, a first slide movable toward and from the work support, a rack and gear mechanism for effecting said movement, a cross slide movable transversely of the first slide, a rack and gear mechanism for reciprocating the cross slide, a spindle carrier journaled in the cross slide, a cutter spindle and cutter journaled in the carrier eccentrically thereof, power operable means for rotating the spindle and carrier including a separate clutch arranged in serial power transmitting relationship, a fluid operable member for actuating said mechanisms, a source of pressure including a reversing valve, a manual control lever for shifting said valve to a starting position and simultaneously engaging the spindle control clutch, means actuable by advance of said member for sequentially operating said mechanisms and their respective slides to engage the cutter with the work, means operable by the cross slide to engage the spindle carrier clutch to cause planetary movement of the cutter spindle, and means trip operable by the carrier for disengaging its own clutch and simultaneously shifting the reverse valve to cause return movement of said fluid operable member and thereby through said mechanisms to return said slides.

10. A milling machine having a work support, a first slide movable toward and from the work support, a rack and gear mechanism for effecting said movement, a cross slide movable transversely of the first slide, a rack and gear mechanism for reciprocating the cross slide, a spindle carrier journaled in the cross slide, a cutter spindle and cutter journaled in the carrier eccentrically thereof, power operable means for rotating the spindle and carrier including a separate clutch arranged in serial power transmitting relationship, a fluid operable member for actuating said mechanisms, a source of pressure including a reversing valve, a manual control lever for shifting said valve to a starting position and simultaneously engaging the spindle control clutch, means actuable by advance of said member for sequentially operating said mechanisms and their respective slides to engage the cutter with the work, means operable by the cross slide to engage the spindle carrier clutch to cause planetary movement of the cutter spindle, means trip operable by the carrier for disengaging its own clutch and simultaneously shifting the reverse valve to cause return movement of said fluid operable member and thereby through said mechanisms to return said slides, and means responsive to return movement of the cross slide to disengage the spindle clutch.

11. A milling machine having a work support, a first slide movable toward and from the work support, a rack and gear mechanism for effecting said movement, a cross slide movable transversely of the first slide, a rack and gear mechanism for reciprocating the cross slide, a spindle carrier journaled in the cross slide, a cutter spindle and cutter journaled in the carrier eccentrically thereof, power operable means for rotating the spindle and carrier including a separate clutch arranged in serial power transmitting relationship, a fluid operable member for actuating said mechanisms, a source of pressure including a reversing valve, a manual control lever for shifting said valve to a starting position and simultaneously engaging the spindle control clutch, means actuable by advance of said member for sequentially operating said mechanisms and their respective slides to engage the cutter with the work, means operable by the cross slide to engage the spindle carrier clutch to cause planetary movement of the cutter spindle, means trip operable by the carrier for disengaging its own clutch and simultaneously shifting the reverse valve to cause return movement of said fluid operable member and thereby through said mechanisms to return said slides, means responsive to return movement of the cross slide to disengage the spindle clutch, and a by-pass valve operable by said member for by-passing said pump to reservoir and thereby stopping the machine.

12. A milling machine having a work support, a first slide movable toward and from the work support, a rack and gear mechanism for effecting said movement, a cross slide movable transversely of the first slide, a rack and gear mechanism for reciprocating the cross slide, a spindle carrier journaled in the cross slide, a cutter spindle and cutter journaled in the carrier eccentrically thereof, power operable means for rotating the spindle and carrier including a separate clutch arranged in serial power transmitting relationship, a fluid operable member for actuating said mechanisms, a source of pressure including a reversing valve, a manual control lever for shifting said valve to a starting position and simultaneously engaging the spindle control clutch, means actuable by advance of said member for sequentially operating said mechanisms and their respective slides to engage the cutter with the work, means trip operable by the cross slide to engage the clutch for the carrier to cause planetary movement of the cutter spindle, and means responsive to initiation of rotation of the carrier to lock said reversing valve so that the slides cannot be moved during planetary movement of the cutter.

13. A milling machine having a work support, a first slide movable toward and from the work support, a rack and gear mechanism for effecting said movement, a cross slide movable transversely of the first slide, a rack and gear mechanism for reciprocating the cross slide, a spindle carrier journaled in the cross slide, a cutter spindle and cutter journaled in the carrier eccentrically thereof, power operable means for rotating the spindle and carrier including a separate clutch arranged in serial power transmitting relationship, a fluid operable member for actuating said mechanisms, a source of pressure including a reversing valve, a manual control lever for shifting said valve to a starting position and simultaneously engaging the spindle control clutch, means actuable by advance of said member for sequentially operating said mechanisms and their respective slides to engage the cutter with the work, and means operable by the cross slide to engage the clutch for causing rotation of the carrier and thereby planetary movement of the cutter about the axis of the carrier, said means including a member positionable to prevent disengagement of the spindle control clutch whereby the cutter spindle cannot be stopped during planetary movement thereof.

14. A milling machine having a work support, a first slide movable toward and from the work support, a second slide reciprocably mounted upon the first slide, mechanisms individual to the respective slides for reciprocating the same, a spindle carrier journaled in one of said slides, a cutter spindle and a cutter journaled in the carrier eccentrically thereof, a power transmission including a prime mover mounted in the slide supporting the carrier, said transmission including control clutches for determining rotation respectively of the spindle and the carrier, individual manually operable means for the respective clutches and interlocking means between said manually operable means for preventing engagement of the control clutch for the carrier until the spindle clutch has been engaged.

15. A milling machine having a work support, a first slide movable toward and from the work support, a second slide reciprocably mounted upon the first slide, mechanisms individual to the respective slides for reciprocating the same, a spindle carrier journaled in one of said slides, a cutter spindle and a cutter journaled in the carrier eccentrically thereof, a power transmission including a prime mover mounted in the slide supporting the carrier, said transmission including control clutches for determining rotation respectively of the spindle and the carrier, individual manually operable means for the respective clutches, interlocking means between said manually operable means for preventing engagement of the control clutch for the carrier until the spindle clutch has been engaged, and means to prevent engagement of the spindle carrier control clutch until the slide upon which the carrier is mounted has been moved to its extreme position.

16. A milling machine having a work support, a first slide movable toward and from the work support, a second slide reciprocably mounted upon the first slide, mechanisms individual to the respective slides for reciprocating the same, a spindle carrier journaled in one of said slides, a cutter spindle and a cutter journaled in the carrier eccentrically thereof, a power transmission including a prime mover mounted in the slide supporting the carrier, said transmission including control clutches for determining rotation respectively of the spindle and the carrier, individual manually operable means for the respective clutches, interlocking means between said manually operable means for preventing engagement of the control clutch for the carrier until the spindle clutch has been engaged, and interlocking means for maintaining the spindle clutch engaged during rotation of the carrier.

ERWIN G. ROEHM.